(12) United States Patent
Chambers et al.

(10) Patent No.: US 9,756,232 B2
(45) Date of Patent: Sep. 5, 2017

(54) LIGHTWEIGHT LED ILLUMINATION ENCLOSURE FOR CONCURRENT USE WITH LIGHTWEIGHT CAMERA MODULE

(71) Applicants: Casey Chambers, Arlington, VA (US); Kenneth Joseph Good, San Diego, CA (US); Jeff Skeen, San Diego, CA (US)

(72) Inventors: Casey Chambers, Arlington, VA (US); Kenneth Joseph Good, San Diego, CA (US); Jeff Skeen, San Diego, CA (US)

( * ) Notice: Subject to any disclaimer, the term of this patent is extended or adjusted under 35 U.S.C. 154(b) by 0 days.

(21) Appl. No.: 14/802,578

(22) Filed: Jul. 17, 2015

(65) Prior Publication Data
US 2017/0019573 A1 Jan. 19, 2017

(51) Int. Cl.
*H04N 5/225* (2006.01)
*H04N 5/232* (2006.01)
*G03B 15/05* (2006.01)

(52) U.S. Cl.
CPC ........... *H04N 5/2256* (2013.01); *G03B 15/05* (2013.01); *H04N 5/2252* (2013.01); *H04N 5/23206* (2013.01); *H04N 5/23216* (2013.01)

(58) Field of Classification Search
None
See application file for complete search history.

(56) References Cited

U.S. PATENT DOCUMENTS

| | | | | |
|---|---|---|---|---|
| 3,583,113 A * | 6/1971 | Winski | ................... | B62D 25/06 52/144 |
| 2008/0012684 A1* | 1/2008 | Fawcett | ............. | G07C 9/00309 340/5.25 |
| 2009/0251312 A1* | 10/2009 | Shelton | ................... | G08B 5/222 340/539.13 |
| 2010/0171145 A1* | 7/2010 | Morgan | ................... | F21K 9/00 257/99 |
| 2011/0095690 A1* | 4/2011 | Sagal | ..................... | B29C 45/14 315/113 |
| 2012/0065708 A1* | 3/2012 | Kinoshita | ............ | A61N 5/0617 607/88 |
| 2013/0046867 A1* | 2/2013 | Seelman | ............. | H04L 12/2807 709/221 |
| 2013/0346633 A1* | 12/2013 | Zhang | ................... | G06F 13/385 710/3 |

FOREIGN PATENT DOCUMENTS

WO   2013103698   7/2013

OTHER PUBLICATIONS

"Dual Hero System: Capture simultaneous footage + create 3D content" GoPro. Retrieved on Jun. 8, 2015 from http://shop.gopro.com/accessories/dual-hero-system/AHD3D-301.html?skipredirect&gcli=.

* cited by examiner

*Primary Examiner* — Mark T Monk
(74) *Attorney, Agent, or Firm* — John L. Rogitz

(57) ABSTRACT

A lightweight housing with a mount that can be attached to a user, sports equipment, or vehicle contains an illumination assembly but no camera. The illumination assembly may communicate via Bluetooth with a similarly-configured nearby camera module to provide illumination for subjects being imaged by the camera module.

27 Claims, 8 Drawing Sheets

LIGHTWEIGHT LED ILLUMINATION ENCLOSURE FOR CONCURRENT USE WITH LIGHTWEIGHT CAMERA MODULE

FIELD

This application pertains to illumination assemblies for providing light to the subjects of portable cameras.

BACKGROUND

U.S. Pat. No. 8,837,928, incorporated herein by reference, discloses a lightweight portable camera that can be mounted on sports equipment, vehicles, or a user.

SUMMARY

As understood herein, illumination to improve the images of the '928 camera can be advantageously provided in a seamless system.

An apparatus includes a hollow parallelepiped shaped enclosure defining a front wall defining a center point. An aperture is formed in the front wall, and a center of the aperture is offset from the center point of the front wall. The enclosure does not contain an imaging device. A hollow heat sink ring is disposed in the aperture and completely circumscribes the aperture, and a focus element is disposed in the hollow sink such that the heat sink and focus element together block the aperture in the front wall. At least one lamp is disposed in the enclosure behind the aperture and positioned to emit light through the focus element.

In examples, the focus element includes a lens and/or a reflector.

The lamp may include at least one light emitting diode (LED), although other illuminators such as liquid crystal displays (LCDs) may be used. In a preferred implementation, three LEDs are used.

One and if desired plural batteries can be disposed in the enclosure to energize the lamp. When plural batteries are used, both may simultaneously supply power to the lamp. Also, an external power supply may be used to energize the lamp(s). To accommodate the external power supply the enclosure may include a direct DC jack with dimensions of 2.5×5 mm rated at 12 VDC and 5 amps.

A sealing element such as gasket or an o-ring or sealant compound may be disposed between the front wall and the heat sink ring to establish a seal therebetween. Similarly, a sealing element may be disposed between the front wall or the heat sink ring and the focus element to establish a seal between the front wall or heat sink ring and the focus element.

A near field communication (NFC) element can be disposed in the enclosure and can be configured for wirelessly communicating with at least one NEC element of at least one component spaced from the enclosure. For example, the NFC element may include a short range ultra high frequency (UHF) transceiver configured to operate in the range of 2.4 GHz to 2.485 GHz and sold under the trade name of "Bluetooth".

The enclosure may also contain a processor and a computer memory comprising instructions executable by the processor to receive input, and responsive to the input, cause the NFC element to send a wireless command to a camera module outside the enclosure to activate a camera in the camera module. The input can be a signal received through a manually-operated button on the enclosure or from a wireless remote control device to energize the lamp.

In addition or alternatively, the instructions may be executable to receive, from a camera module via the NFC element, an activation command, and responsive to the activation command, activate the lamp.

In addition or alternatively, the instructions may be executable to intercept, from a remote control configured to activate a camera in a camera module using NFC, a camera activation signal configured to activate the camera in the camera module, and responsive to the camera activation signal, activate the lamp.

In another aspect, a device separate from a camera module to provide illumination onto subjects imaged by the camera module includes a hollow housing defining a height of approximately two centimeters to seven centimeters, a width of approximately two centimeters to seven centimeters, and a depth of approximately one centimeter to five centimeters, and a weight of between thirty grams and one hundred fifty grams. In one example, without batteries in the housing the device weighs around 64 grams. The housing defines a front face formed with a lens window structured so that at least one light emitting diode (LED) is substantially aligned with the lens windows when an LED assembly is secured within the camera housing, with the LED assembly being disposed in the housing in lieu of a camera. The housing includes first and second housing portions movable relative to each other to expose an interior of the housing. A securing structure is coupled to the housing for securing the housing to at least one mounting device.

In another aspect, an apparatus includes a computer memory that is not a transitory signal and that includes instructions executable by a processor to receive input, and responsive to the input, cause a near field communication (NFC) in a portable enclosure containing a lamp to send a wireless command to a camera module outside the enclosure to activate a camera in the camera module.

In another aspect, an apparatus includes a computer memory that is not a transitory signal and that includes instructions executable by a processor to receive, from a camera module via a near field communication (NFC) element in an enclosure holding at least one lamp, an activation command. The camera module is spaced from the enclosure holding the NFC element and the lamp. The instructions are executable to, responsive to the activation command, activate the lamp.

In another aspect, an apparatus includes a computer memory that is not a transitory signal and that includes instructions executable by a processor to intercept, from a remote control configured to activate a camera in a camera module using near field communication (NFC), a camera activation signal configured to activate the camera in the camera module. Responsive to the camera activation signal, a lamp is activated in an enclosure spaced from the camera module.

The details of the present application, both as to its structure and operation, can best be understood in reference to the accompanying drawings, in which like reference numerals refer to like parts, and in which:

DETAILED DESCRIPTION

Figure 1:
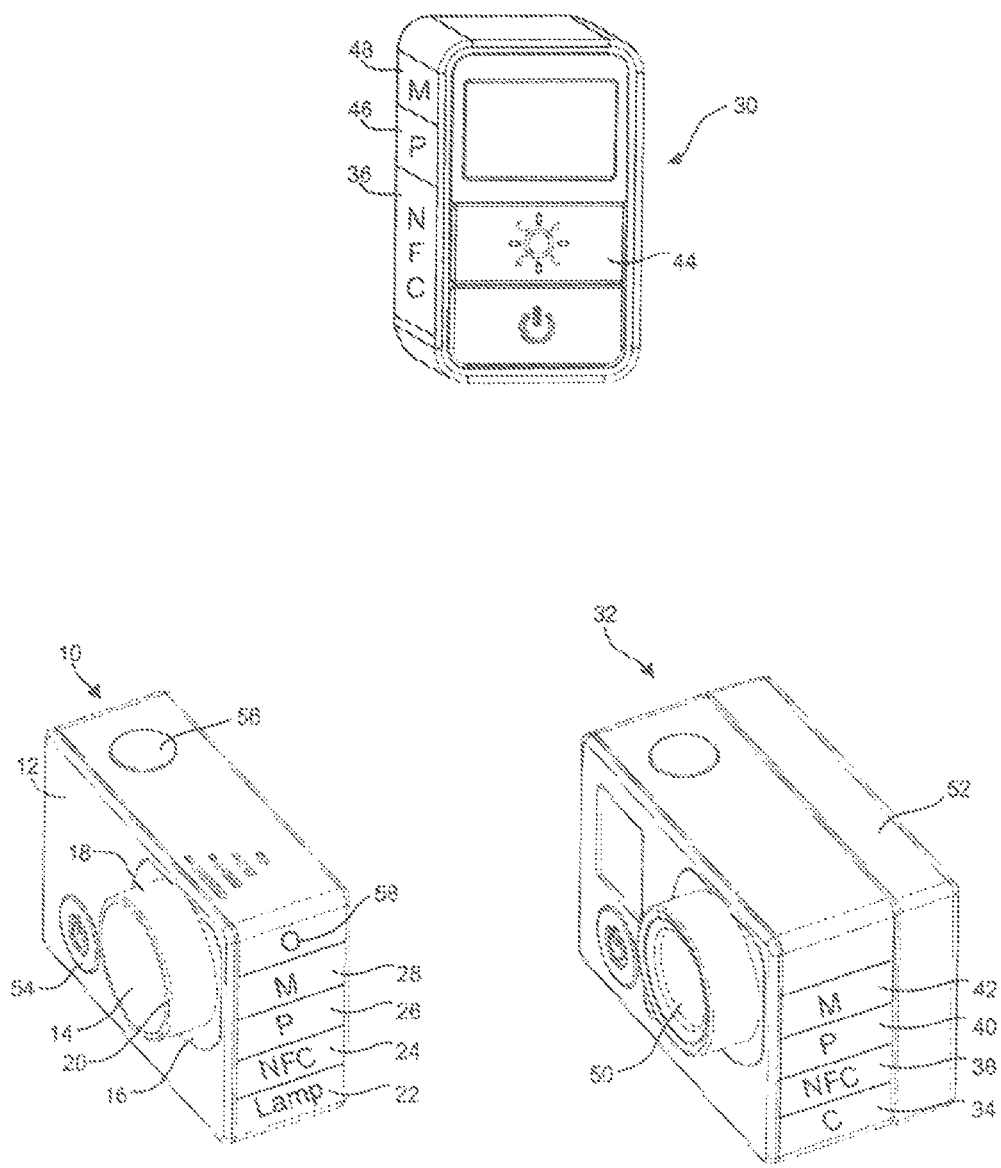
FIG. 1 is a block diagram of an example system according to present principles, with some components shown schematically.

This disclosure relates generally to aspects of consumer electronics (CE) devices and in particular to illumination systems for digital cameras. A system herein may include server and client components, connected over a network such that data may be exchanged between the client and server components. The client components may include one or more computing devices including portable cameras, portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers and/or gateways may include one or more processors executing instructions that configure the servers to receive and transmit data over a network such as the Internet. Or, a client and server can be connected over to local intranet or a virtual private network.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed steps undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now referring to FIG. 1, a hollow illumination enclosure 10 is shown with a parallelepiped configuration. "Illumination enclosure" and "lamp enclosure" may be used interchangeably herein. Note that FIG. 1 illustrates the lamp enclosure and a camera enclosure described more fully below, with either or both enclosures disposable in respective waterproof housings, also described further below.

The lamp enclosure 10 defines a front wall 12 in turn defining a center point 14. An aperture 16 is formed in the front wall 12, and in the example shown the center of the aperture 16 is offset from the center point 14 of the front wall 12. The enclosure 10 does not contain an imaging device.

A hollow heat sink ring 18 may be disposed in the aperture 16 to completely circumscribe the aperture 16, such that the entire periphery of the aperture abuts a complementarily-shaped periphery of the heat sink ring. The heat sink ring 18 may be made of e.g., aluminum or a thermoplastic. The outer periphery of the heat sink ring may be rectangular as shown, with a round opening in the middle of the ring which is completely filled with a focus element 20 such as a lens and/or reflector. The heat sink ring 18 and focus element 20 together block the aperture 16 in the front wall.

The next four-described components are shown schematically in FIG. 1. At least one lamp 22 is disposed in the enclosure behind the aperture 16 and is positioned to emit light through the focus element 20. The lamp may include at least one light emitting diode (LED), although other illuminators such as liquid crystal displays (LCDs) may be used. In a preferred implementation, three LEDs are used.

A near field communication (NFC) element 24 also can be disposed in the enclosure and can be configured for wirelessly communicating with NFC elements of other components that are spaced from the enclosure 10. For example the NFC element may include a short range ultra high frequency (UHF) transceiver configured to operate in the range of 2.4 GHz to 2.485 GHz and sold under the trade name of "Bluetooth".

The enclosure 10 may also contain a processor 26 and a computer memory 28 which can function according to further description below. The processor 26 typically communicates with and controls the memory 28, lamp 22, and NEC element 24.

The other components alluded to above with which the illumination or lamp enclosure 10 can communicate via NFC such as Bluetooth include a remote control 30 and a camera module 32. The remote control 30 may be configured to control a camera 34 in the camera module 32 by means of sending command via a remote control NFC element 36 to a camera module NFC element 38, which commands are sent to a camera module processor 40 accessing a camera module memory 42. The components 34, 38, 40, and 42 of the camera module 32 are shown schematically in FIG. 1. Commands may be generated on the RC 30 by a user manipulating one or more control buttons 44, which input a signal to an RC processor 46 accessing an RC memory 48 to control the RC NFC element 36 to send the commands to the camera module 32. Note that the camera module 32 may include an enclosure that is substantially identical in shape and size to the illumination enclosure 10, except that a camera 34 is positioned behind a covered opening 50 in the camera module 32.

In some implementations, a communication control dongle 52 may be detachable engaged with the camera module 32. The dongle 52 may include near field communication or other wireless transceivers controlled by one or more processors to "slave" the camera processor 40 to the lamp processor 26 and/or to the RC processor 46, such that operation of the camera 34 may be controlled either by the lamp processor 26 and/or RC processor 46 according to further disclosure below.

Completing the description of FIG. 1 by returning to example features of some embodiments of the lamp enclosure 10, a manipulable power toggle 54 may be provided on the front surface of the enclosure to energize and deenergize the electrical components in the lamp enclosure 10.

Also, a manipulable actuation toggle 56 may be provided on the top surface of the enclosure to activate and deactivate the lamp(s) 22 when the other electrical components are operating. In example embodiments, single click to this button toggles the light state (on/off), but a press and hold when the lamp is on will initiate a dimming sequence in which the lamp continuously brightens from its current brightness state until it reaches its maximum brightness. Once maximum brightness is reached, the lamp is caused to flash once and then begin to dim, in reverse from brightest to darkest. Again once the lower limit is reached (for example, to zero brightness) the lamp is caused to flash again and then continue to increase in brightness thereby beginning the cycle again. All of this occurs as long as the user keeps the button 56 pressed. The desired brightness level is set by releasing the button. This brightness setting is remembered when the lamp is toggled from on to off. These operations are controlled by the processor(s) disclosed herein controlling the one or more lamps according to present principles.

Additionally, a manipulable wireless activation toggle 58 may be provided on the left or right side surface of the enclosure to activate and deactivate the NFC element 24 when the other electrical components are operating.

Figure 2:
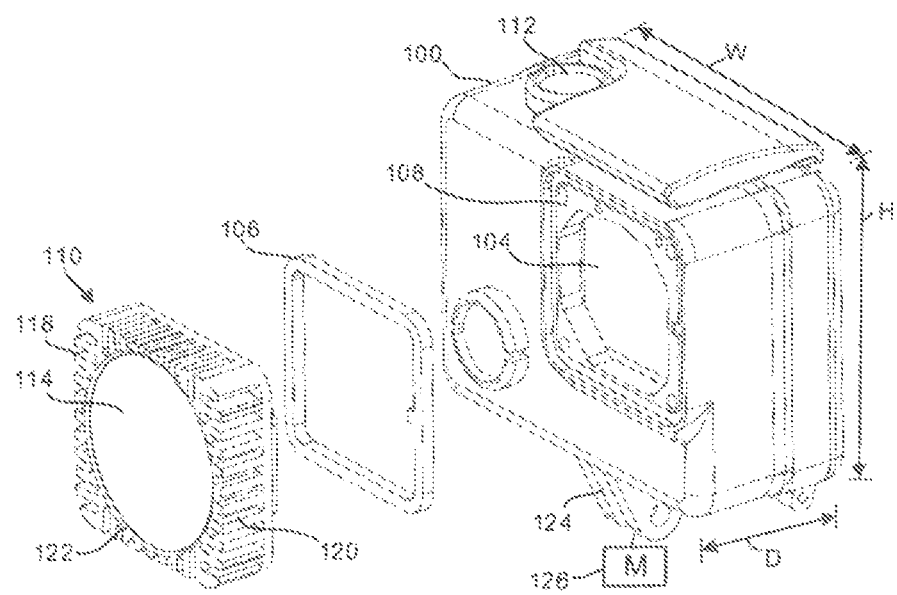
FIG. 2 is an exploded perspective view of an example lamp housing.
Figure 3:
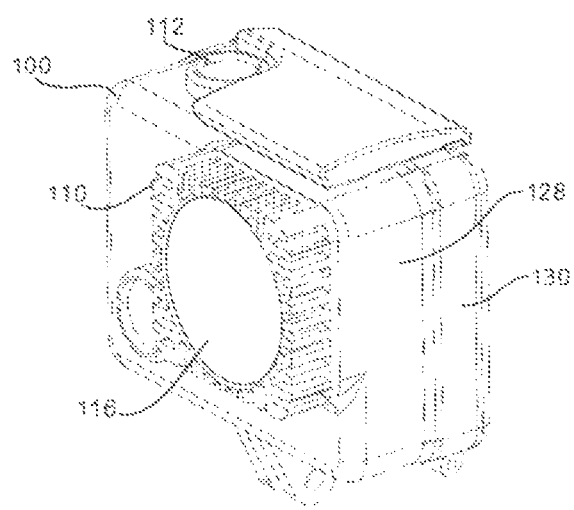
FIG. 3 is a perspective view of the example lamp housing shown in FIG. 2.

FIGS. 2 and 3 illustrate an example waterproof housing. In one embodiment, a lamp housing 100 has a small form factor (e.g., a height "H" of approximately 2 to 7 centimeters, a width "W" of approximately 2 to 7 centimeters, and a depth "D" of approximately 1 to 5 centimeters), and is lightweight (e.g., approximately 30 to 150 grams). The lamp housing 100 can be rigid (or substantially rigid) (e.g., plastic, metal, fiberglass, etc.) or pliable (or substantially pliable) (e.g., leather, vinyl, neoprene, etc.). In one embodiment, the lamp housing 100 may be appropriately configured for use in various elements. For example, the lamp housing 100 may include a waterproof enclosure that protects the lamp enclosure 10 shown in FIG. 1 from water when used, for example, while surfing or scuba diving.

Note that the lamp housing 100 does not contain any imaging apparatus (such as a digital camera), and instead contains the lamp enclosure 10.

Portions of the lamp housing 100 may include exposed areas to allow a user to manipulate power buttons and lamp activation buttons. Alternatively, such areas may be covered with a pliable material to allow the user to manipulate the buttons through the lamp housing 100. For example, in one embodiment the top face of the lamp housing 100 includes a lamp activation button 112 structured so that the actuation toggle 56 of the lamp enclosure 10 in FIG. 1 is substantially aligned with the outer activation button 112 when the lamp enclosure 10 is secured within the lamp housing 100.

The front face of the lamp housing 100 can include 104 structured so that a lamp of the interior lamp enclosure 10 is aligned with the lens windows 104. The lens window 104 can be adapted for use with a conventional lens, a wide angle lens, a reflector, a color filter for changing color temperature and color of the light emitted from the lamp, or any other optics to appropriately focus illumination light from the lamp assembly onto a subject being imaged by the camera module. In this embodiment, the lens window 104 includes a waterproof seal 106 shaped in the embodiment shown as a rectangular hollow gasket so as to maintain the waterproof aspect of the housing 100.

FIG. 2 best shows that the gasket 106 is sandwiched between the rectilinear surface 108 of the front wall of the housing 100 that surrounds the lens window 104 and a hollow heat sink 110. The hollow heat sink 110 may be secured to the housing 100 using, e.g., threaded fasteners. The heat sink 110 may be made of, e.g., aluminum or other appropriate heat sink material to convey heat generated by the lamps of the lamp enclosure 10 away from the lamp enclosure.

In the example shown, the heat sink has a round interior periphery 114 that may be filled by a round lens 116 (FIG. 3) or other transparent material. In contrast, the heat sink 110 has a rectilinear outer periphery 118 as shown. Fin spaces 120 are formed in the heat sink 110 and each fin space 120 may extend parallel to the depth dimension "D" from the front face 122 of the heat sink 110 into a respective side or top or bottom surface of the heat sink 110 as shown, thereby forming adjacent fins that straddle each fin space 120.

In one embodiment, the lamp housing 100 includes one or more securing structures 124 for securing the lamp housing 100 to one of a variety of mounting devices. For example, the housing 100 can be secured to a clip-style mount 126 (shown schematically in FIG. 2; details of an example mount 126 that may be used are disclosed in the above-incorporated patent). After securing the housing to the mount, the mount can in turn be optionally secured to a user's backpack, sports equipment, or body. This allows a user to use a camera module such as the one described above in reference to FIG. 1 in conjunction with the lamp housing 100 to illuminate a subject being imaged in a hands-free configuration or manner without having to physically hold, safeguard, or otherwise physically handle the lamp housing 100 and lamps therein.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

Figure 4:
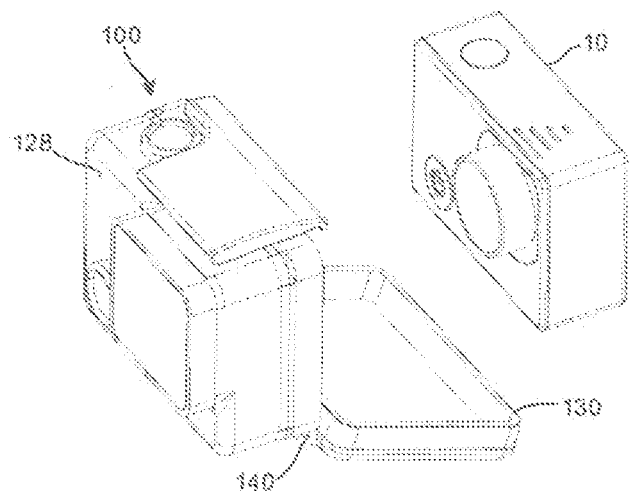
FIGS. 4 and 5 respectively show the lamp housing in FIGS. 2 and 3 in the open and closed configurations.
Figure 5:
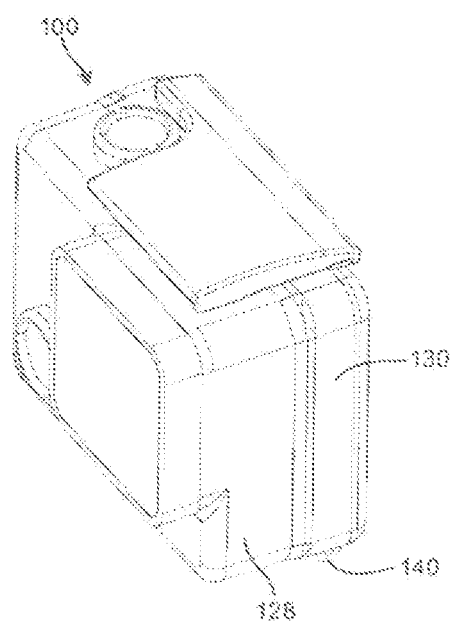

FIGS. 4 and 5 best show that the housing 100 may include front and rear housing portions 128, 130 detachably coupled with other, with both portions being essentially parallel to the front face when in the closed configuration of FIG. 5. In the example shown, the portions 128, 130 are hingedly coupled along a bottom hinge 140. In the open configuration of FIG. 4, the lamp enclosure 10 may be inserted into the housing 100 and retracted from the housing 100. The portions are collectively structured to enclose the lamp enclosure 10 within the cavity that is formed when the portions are in a closed configuration.

Figure 6:
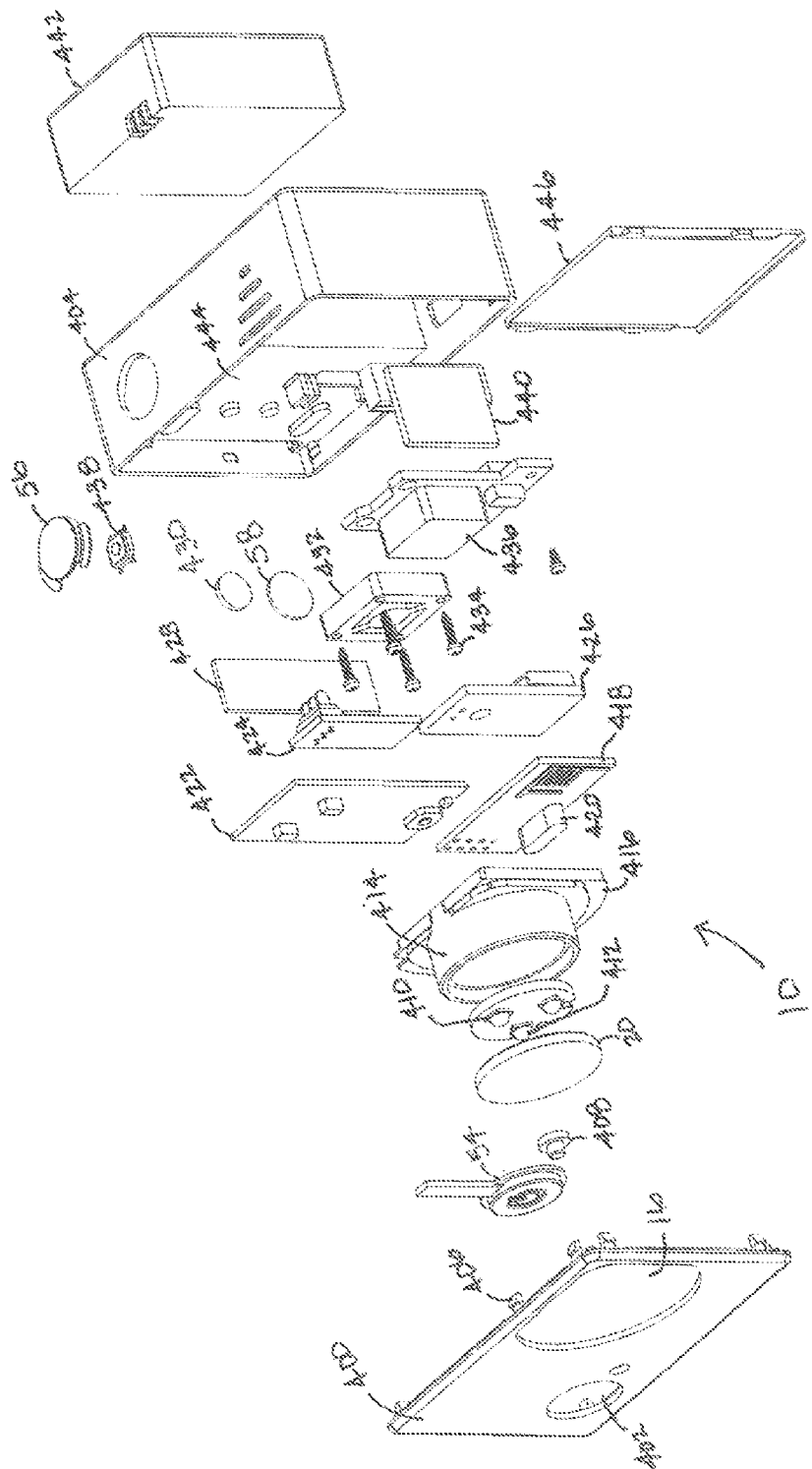
FIG. 6 is an exploded perspective view of an example lamp assembly.

FIG. 6 shows an exploded perspective view of an example lamp enclosure 10 according to present principles. As shown, a front plate 400 defining the aperture 16 shown in FIG. 1 and a button opening 402 to accommodate the toggle 54 of FIG. 1 is attached to a hollow parallelepiped-shaped rear portion 404 using, e.g., clips 406 that may be formed during injection molding on the front plate 400 and that are configured to snappingly engage the interior periphery of the rear portion 404. Threaded fasteners alternatively may be used for this purpose. Note that a light pipe 408 may be used in conjunction with the toggle 54 to facilitate control signals being generated as appropriate from manipulation of the toggle 54.

The focus element 20 is arranged to at least partially block the aperture 16 in cooperation with structure to be discussed shortly. Behind the focus element 20 is a thermally insulative lamp electrical board 410 supporting one or more lamps 412. In the example shown, the lamp electrical board 410 supports three lamps 412 arranged as vertices on a triangle. The lamps 412 may be light emitting diodes (LED) rated at, e.g., three amperes, ten Watts, with 125 degrees view angle.

A cylindrical internal heat sink 414 attached to or made integrally with a hollow base 416 receives the lamp board 410 and focusing element 20. The heat sink 414 may be made of an appropriate heat sink material. The base 416 fits snugly into the contour of the aperture 16 to completely block the aperture 16 in cooperation with the focus element 20 and heat sink 414.

A wireless transceiver board 418 with wireless transceiver 420 may be disposed behind the heat sink 414 in the embodiment shown, although other locations may be used to optimize communication range or fidelity. The wireless transceiver may be, e.g., a Bluetooth transceiver operating as a short range ultra high frequency (UHF) transceiver in the range of 2.4 GHz to 2.485 GHz.

A processor assembly 422 configured to hold the lamp processor 26 shown in FIG. 1 may be arranged behind the heat sink 414, above the transceiver board 418. This processor assembly communicates electrically with the control buttons described herein as well as with the Bluetooth transceiver board 418 and lamp electrical board 410 for controlling and/or receiving signals from these elements. Behind the processor assembly 422, a battery rail printed circuit board (PCB) 424 may be disposed as part of the power supply system of the lamp enclosure 10. Also, a battery charger board 426 with mini-USB charging connector may be disposed adjacent the battery rail PCB 426 to accept charge current for the below-described battery. Alternatively, a DC jack for receiving an external power supply/charging may be used.

A wireless activation button PCB 428 may cooperate with the wireless activation toggle 58 shown in FIG. 1 to send Bluetooth transceiver activation and deactivation signals to the lamp processor 26. If desired the toggle 58 may be associated with a light pipe 430.

In some embodiments, a direct current (DC) micro fan 432 may be attached using threaded fasteners 434 to the rear portion 404 to provide cooling air flow within the lamp enclosure 10. An LED driver 436 may be similarly mounted in the enclosure to provide drive current to the LEDs 412. Also mounted on the rear portion 404 is the toggle 56 and cooperating tactile switch 438, to provide power on and off signals to the lamp processor 26 or other appropriate power component such as LED on/off commands and dimming commands as disclosed above.

In the non-limiting example shown, a 30 pin spreader PCB 440 with connector is provided in the enclosure to facilitate electrical communication among various electrical components shown. As an alternative to the PCB 440, a female to male 30 pin connector that accepts a ribbon cable connection within the housing 404 can be used.

A DC battery 442 is sized to fit snugly with a complementarily-shaped battery pocket 444 formed a part of the rear enclosure 404. A battery cover plate 446 engages the rear portion 404 to removably cover the battery pocket 444, with the rear face of the plate 446 preferably flush with the rear face of the rear portion 404.

Figure 7:
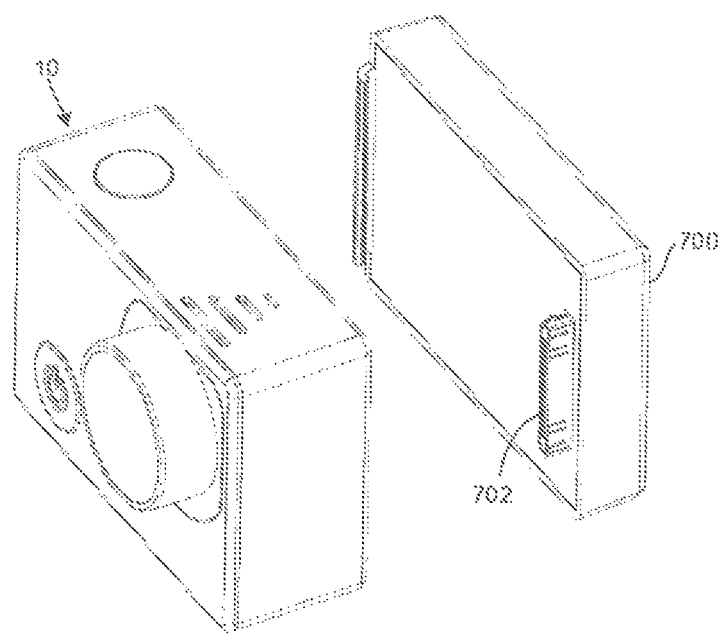
FIG. 7 is an exploded perspective view of the lamp assembly with an external auxiliary battery.

In addition to the battery 442, an auxiliary battery 700 (FIG. 7) may be engaged with the rear portion of the lamp enclosure 10 via a connector pin assembly 702 that mates with, e.g., the LED driver 436 to pin spreader PCB 440 shown in FIG. 6 or other appropriate component to provide DC power in addition to the battery 442 to the components within the enclosure 10.

Figure 8:
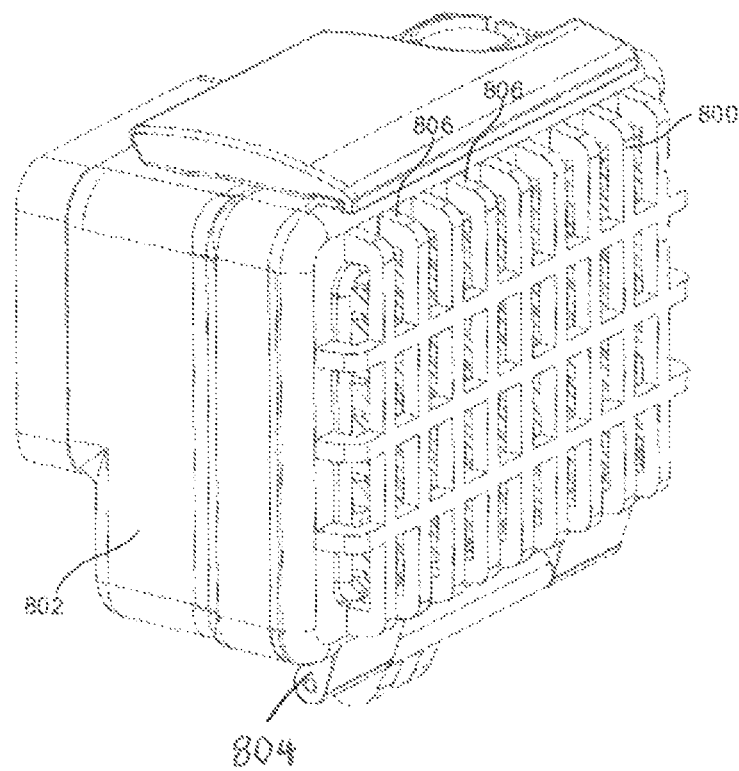
FIGS. 8 and 9 are perspective and exploded views, respectively of an alternate rear housing portion configured as an external heat sink.
Figure 9:
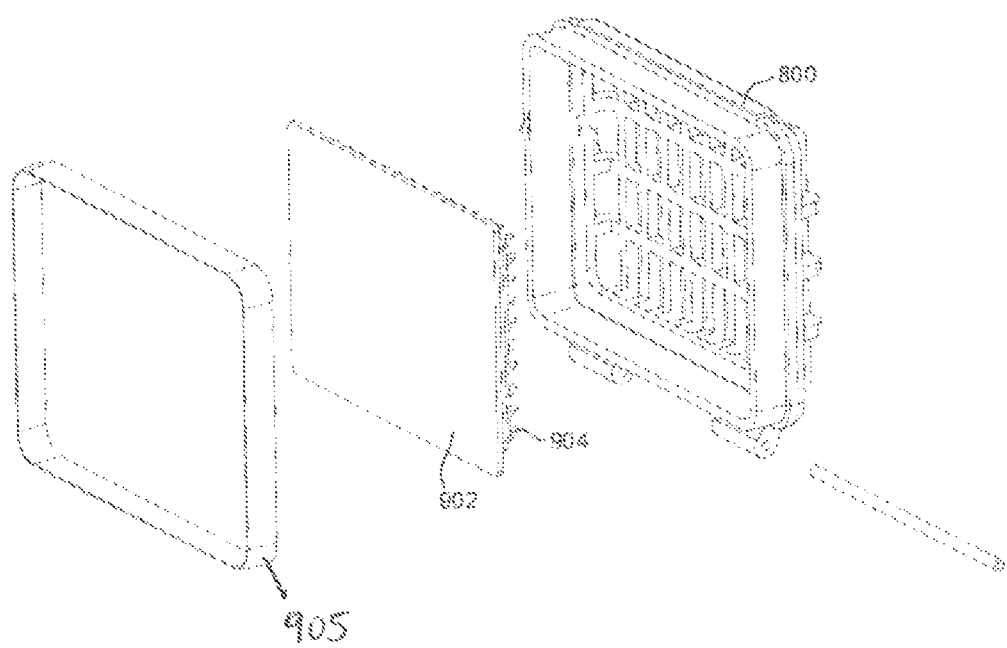

FIGS. 8 and 9 show an alternative embodiment of the rear housing portion of the housing 100. As shown, a rear housing portion 800 (FIG. 8) may be used in lieu of the rear housing portion 130 shown in FIGS. 2-5 and may be hingedly coupled to a front portion 802 along a bottom hinge 804. The rear housing portion 800 is formed with plural rows 804 of vertically-oriented protective fins 806 to prevent a user from touching the vapor chamber, although the fins 806 may be oriented in other directions.

FIG. 9 best shows that the portion 800 defines a vapor chamber 900 that can be covered by a vapor chamber plate 902, which may be formed, on the surface facing the chamber, with plural cooling fins 904. Vapor may fill the chamber 900 with the fins 904 of the plate 902 cooperating with the fins 806 of the portion 800 to convey heat away from the components within the front portion 802 of the housing.

Figure 10:
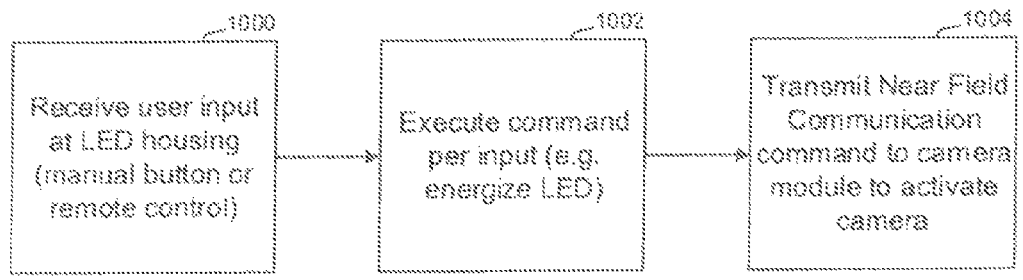
FIG. 10 is a flow chart showing example logic according to a first embodiment.
Figure 11:
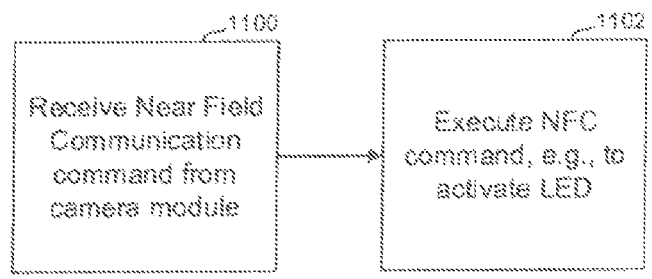
FIG. 11 is a flow chart showing example logic according to a second embodiment.
Figure 12:
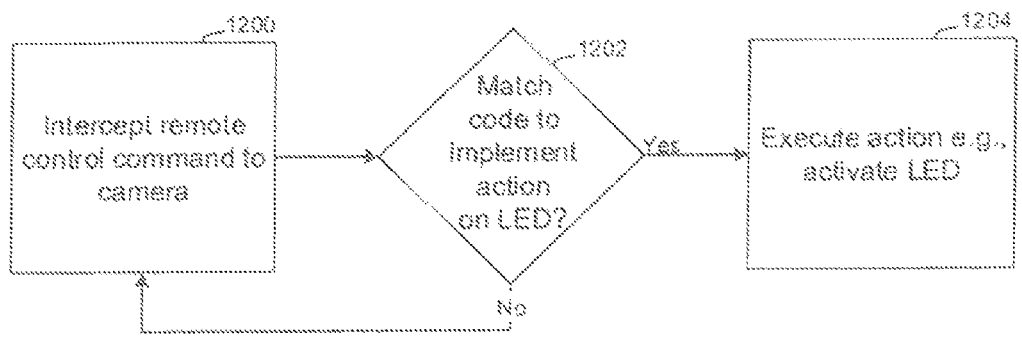
FIG. 12 is a flow chart showing example logic according to a third embodiment.

FIGS. 10-12 show example logic that may be implemented by one or more of the processors described herein according to present principles. It is to be understood that in some implementations, each embodiment of the logic may be initiated by an initial step of enabling wireless communication by pressing the wireless activation toggle 58 to allow commands to be sent and received by the lamp processor 26. This is a power saving feature as it allows for the communications to be disabled to save power.

Commencing at block 1000 of FIG. 10, input is received, e.g., from a user manipulating the lamp actuation toggle 56 shown in FIG. 1 or from the RC 30 responsive to the user manipulating the element 44 of the RC. Responsive to the input and assuming the input is to activate the lamp(s), at block 1002 the lamp(s) in the lamp enclosure 10 energized, and at block 1004 (also in response to the input), a wireless command is sent via the NFC transceiver 24 to the camera module 32 to command the camera module 32 to activate the camera 34. Typically this command may be received via the dongle 52, which controls the camera processor 40 to activate the camera 34 essentially in response to a user activating the LEDs in the lamp enclosure 10.

On the other hand, commencing at block 1100 in FIG. 11, the NFC element 24 of the lamp enclosure 10 receives from the camera module 32 in activation command, which is sent to the lamp processor 26. Responsive to the activation command, the lamp(s) 22 are activated at block 1102. Note that the command from the camera module 32 may be initiated responsive to a user manipulating a shutter button on the camera module 32 to begin imaging.

Still again, FIG. 12 shows yet another embodiment in which, at block 1200, the lamp processor 22 via the NFC element 24 intercepts, from the RC 30, a signal. For instance, the signal from the RC can be a camera activation signal configured to activate the camera 34 in the camera module 32 and thus is intended for the camera module 32. However, the same signal can be piggybacked to activate the lamp(s) 22. Accordingly, at decision diamond 1202, the lamp processor 26 determines whether the code in the intercepted RC signal matches a predetermined code that has been designated as a code to implement action in the lamp enclosure 10. For example, the predetermined code may match a camera activation code. Responsive to the intercepted signal from the RC having a code matching the predetermined code, the lamp(s) 22 are energized at block 1204.

While the particular LIGHTWEIGHT LED ILLUMINATION ENCLOSURE FOR CONCURRENT USE WITH LIGHTWEIGHT CAMERA MODULE is herein shown and described in detail, it is to be understood that the subject matter which is encompassed by the present invention is limited only by the claims.

What is claimed is:
1. Apparatus comprising:
    a hollow parallelepiped shaped enclosure defining a front wall defining a center point, a non-circular aperture being formed in the front wall, the aperture defining a center offset from the center point of the front wall;
    a hollow heat sink ring disposed within the aperture;
    a focus element juxtaposed with the heat sink ring, wherein the heat sink ring and focus element together block the aperture in the front wall;
    at least one lamp disposed in the enclosure behind the aperture and positioned to emit light through the focus element;
    a manipulable actuation toggle on the enclosure to activate and deactivate the at least one lamp, wherein a single click to the actuation toggle toggles a state of the lamp, a press and hold of the actuation toggling initiates a dimming sequence in which the lamp continuously brightens from a current brightness until it reaches a maximum brightness, wherein responsive to maximum brightness being reached, the lamp is caused to flash once and then begin to dim.

2. The apparatus of claim 1, wherein the focus element includes a lens.

3. The apparatus of claim 1, wherein the focus element includes a reflector.

4. The apparatus of claim 1, wherein the at least one lamp includes at least one light emitting diode (LED).

5. The apparatus of claim 4, wherein the at least one lamp includes at least three LEDs.

6. The apparatus of claim 1, comprising at least one battery engaged with the enclosure to energize the lamp.

7. The apparatus of claim 1, comprising at least one sealing element disposed between the front wall and the heat sink ring to establish a seal therebetween.

8. The apparatus of claim 1, comprising at least one sealing element disposed between the front wall or the heat sink ring and the focus element to establish a seal between the front wall or heat sink ring and the focus element.

9. The apparatus of claim 1, comprising at least one near field communication (NFC) element in the enclosure configured for wirelessly communicating with at least one NFC element of at least one component spaced from the enclosure.

10. The apparatus of claim 9, wherein the NFC element includes a short range ultra high frequency (UHF) transceiver configured to operate in the range of 2.4 GHz to 2.485 GHz.

11. The apparatus of claim 1, comprising a front plate defining the front wall, the front plate also defining a button opening accommodating a power mechanism operable to energize at least one electrical component in the apparatus.

12. The apparatus of claim 1, comprising at least one lamp electrical board behind the focus element inside the enclosure and supporting the at least one lamp.

13. The apparatus of claim 1, wherein the heat sink ring comprises at least one base formed integrally with at least one hollow cylinder, the base having an endless non-circular periphery, the non-circular aperture defining an endless non-circular periphery an entirety of which abuts the periphery of the base.

14. The apparatus of claim 13, wherein the hollow cylinder of the heat sink ring is completely filled with the focus element.

15. The apparatus of claim 13, wherein the base of the heat sink ring receives at least one lamp electrical board.

16. The apparatus of claim 1, comprising a wireless transceiver board disposed in the enclosure and supporting at least one wireless transceiver.

17. The apparatus of claim 1, comprising a processor assembly in the enclosure and supporting at least one lamp processor behind the heat sink ring.

18. The apparatus of claim 1, comprising a battery printed circuit board (PCB) disposed within the enclosure.

19. The apparatus of claim 1, comprising a battery charger board in the enclosure and comprising a mini-USB charging connector to accept charge current for a battery.

20. The apparatus of claim 17, comprising a wireless activation button circuit board cooperating with a wireless activation toggle to send transceiver activation signals to the lamp processor.

21. The apparatus of claim 1, comprising a direct current (DC) fan in the enclosure.

22. The apparatus of claim 1, comprising at least one pin spreader circuit board in the enclosure to facilitate electrical communication among various electrical components in the enclosure.

23. A system, comprising:
at least one hollow illumination enclosure comprising at least one wireless transceiver and at least one lamp;
at least one remote control (RC) comprising at least one transceiver;
at least one camera module comprising at least one camera and at least one receiver to receive commands from the RC to control the camera, the illumination enclosure wirelessly communicating with at least the RC or the camera module;
and a manipulable actuation toggle on the enclosure to activate and deactivate the at least one lamp, wherein a single click to the actuation toggle toggles a state of the lamp, a press and hold of the actuation toggling initiates a dimming sequence in which the lamp continuously brightens from a current brightness until it reaches a maximum brightness, wherein responsive to maximum brightness being reached, the lamp is caused to flash once and then begin to dim.

24. The system of claim 23, wherein the camera module is substantially identical in shape and size to the illumination enclosure.

25. The system of claim 23, comprising a communication control element engaged with the camera module to "slave" a camera processor in the camera module to a lamp processor in the illumination module and/or to an RC processor in the RC such that operation of the camera is controlled by the lamp processor and/or RC processor.

26. A device, comprising:
a lamp enclosure defining a front wall in turn defining a center point;
an aperture formed in the front wall, a center of the aperture being is offset from the center point of the front wall;
a hollow heat sink assembly disposed in the aperture such that an entire endless periphery of the aperture abuts a complementarily-shaped endless periphery of the heat sink assembly, a through-passageway of the heat sink assembly being completely filled with a focus element such that the heat sink assembly and focus element together completely block the aperture in the front wall;
at least one lamp disposed in the enclosure behind the aperture and positioned to emit light through the focus element;
a manipulable power toggle on the enclosure to energize and deenergize electrical components in the enclosure;
and a manipulable actuation toggle on the enclosure to activate and deactivate the at least one lamp, wherein a single click to the actuation toggle toggles a state of the lamp, a press and hold of the actuation toggling initiates a dimming sequence in which the lamp continuously brightens from a current brightness until it reaches a maximum brightness, wherein responsive to maximum brightness being reached, the lamp is caused to flash once and then begin to dim.

27. The device of claim 26, wherein endless periphery of the heat sink assembly is not round.

* * * * *